June 2, 1942.　　　　F. TRYFUS　　　　2,285,179
ARTIFICIAL TOOTH
Filed July 27, 1938

F. Tryfus
Inventor by: Glascock Downing Seebold
Attys.

Patented June 2, 1942

2,285,179

UNITED STATES PATENT OFFICE 2,285,179

ARTIFICIAL TOOTH

Frédéric Tryfus, Paris, France, assignor to Bioform Dental Corporation, New York, N. Y., a corporation of New York Application July 27, 1938, Serial No. 221,596
In France August 3, 1937

2 Claims. (Cl. 32—10)

My invention relates to artificial teeth made of porcelain or the like which are more especially intended for bridges and has for its object to eliminate the defects of the arrangements now used and to provide an artificial tooth which fulfills aesthetic conditions by the fact that the metal remains invisible, and hygienic and biological requirements by resting on the gum with a polished porcelain surface, said tooth being furthermore very stable, easy to manufacture industrially and enabling replacing and repairs to be carried out readily.

The artificial tooth according to my invention is essentially characterized by the fact that it comprises a porcelain body, in the lingual face of which is provided a recess having on the side of the triturating face at least one first bearing surface which is inclined relatively to the vertical, said body having at least a second bearing surface which is likewise inclined relatively to the vertical and is faced in the opposite direction to the previous one, said recess being intended to serve as a housing for at least a part of a metal anchoring member which rests against said two bearing surfaces and is adapted to be fixed to the body of the tooth by sealing.

Said anchoring member may form part of a metal or other support forming a bridge.

A plurality of adjacent teeth according to the invention may be secured to the same supporting bridge which is provided with a number of anchoring members connected together on the side turned towards the inside of the jaw, and said anchoring members, said support and the assembly formed by the latter and the teeth are also a part of my invention.

According to an embodiment, said bearing surfaces are formed by a blind hole or recess which extends radially relatively to the body of the tooth and is provided in the lingual face of same, said hole being intended to cooperate with at least one pin of an anchoring member which pin is adapted to be inserted into said hole.

Said radial hole may have a cross section of any appropriate shape, of round, oval, polygonal, or other shape, and may widen out at its inner end to enable two or more arms of said pin forming the end of the aforesaid pin to be lodged which tend to move apart resiliently.

In combination with said embodiment, the body of the tooth may have a substantially horizontal and U-shaped groove provided in its lingual face, preferably on a level with the end of the radial hole, the metal anchoring member in this case comprising the aforesaid pin and a hoop which is intended to be lodged in said groove in such a manner as to embrace the tooth and merge into its surface and is preferably applied resiliently to said groove, said member advantageously performing the function of an anchor.

The aforesaid groove, which may in certain cases cover substantially the entire lingual face of the crown of the tooth, is of a height which is chosen according to the nature of the tooth and the requirements of the art and, in general, it is shaped like a continuous groove of U-shaped or like cross-section.

Said groove is preferably provided at both its ends on the lateral faces of the tooth, with an extension projecting within the body of the tooth and which is intended to serve as a housing for projections which are provided at the ends of the two arms of the resilient hoop of the anchoring member.

Other features and advantages of my invention will moreover become apparent from the ensuing description taken in conjunction with the accompanying drawing which is given solely by way of example and in which:

Fig. 8 is a sectional elevation of another modification of which

According to the embodiment shown in Figs. 1 to 7, it has been assumed that it was required to form a bridge comprising two molars 1 and 2 and one pre-molar 3, these three teeth being surrounded by two teeth of which a part remains, in this case a canine 4 and a molar 5.

Figure 1:
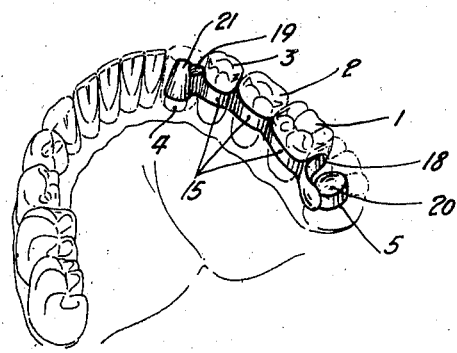
Fig. 1 is a perspective view of a bridge according to the invention mounted in a jaw.
Figure 2:
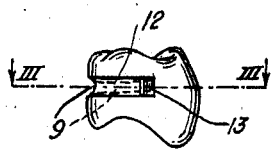
Fig. 2 is a side view of a tooth body.
Figure 5:
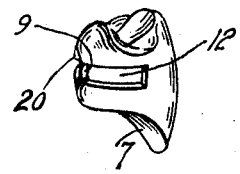
Fig. 5 is a perspective view of a slightly modified tooth body.
Figure 6:
Fig. 6 is a similar view to Fig. 5, in which the anchoring member is in position.

The porcelain bodies which are used for forming this bridge, as shown in Figs. 5 and 6, have their lower surface 7 bent over in the shape of a saddle so as to fit on the upper surface of the gum on which they are intended to be applied. One or a plurality of said bodies, for example the pre-molar 3, may be provided as is known with a root shaped extension which is intended to penetrate into a cavity of the gum.

Figure 3:
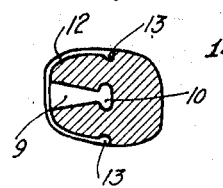
Fig. 3 is a section along the line III—III of Fig. 2.
Figure 4:
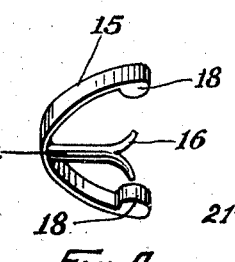
Fig. 4 is a perspective view of an anchoring member.

For fixing it in position, each tooth is provided on its inner face with a cavity formed by a blind hole 9 which extends radially relatively to the conical shaped tooth and terminates inside the tooth by a widened portion 10. Said hole is shown inclined in Fig. 2 and, as shown in Fig. 3 flares outwardly.

Figure 7:
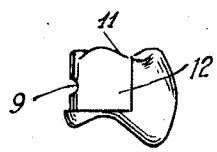
Fig. 7 is a similar view to Fig. 2, of a modification.

On the other hand, a groove 12 is provided in the tooth, on a level with the hole 9, on its lingual face, and which embraces the crown of the tooth up to about two thirds of its lateral faces. Said groove may be of rectangular cross-section, as shown in Figs. 1 to 3, 5 and 6, or may be extended up to the triturating face 11, as shown in Fig. 7. It has been assumed in Figs. 2 and 3 that the groove 12 terminates at each of its ends by an extension or recess 13.

Each tooth 1, 2 and 3 is secured to an anchoring member formed by a rod 14 fixed at the centre of a preferably resilient metal hoop 15. The rod 14 has a length corresponding to the depth of the hole 9 in which it is intended to be sealed and terminates by two resilient arms 16 (Fig. 4) which are intended to bear on the surfaces limiting the widened portion 10.

The hoop 15 is of a shape and thickness corresponding to the recess 12 and its two arms which embrace the tooth terminate by projections 18 which are intended to penetrate resiliently into the recesses 13 when same exist. The said hoop merges into the surface of the body of the tooth 3.

Referring to Figs. 5 and 6, the recess 12 is provided with a widened portion 20 which is concentric with the outer bounding surface of the hole 9 and serves as a housing for a corresponding reinforced portion 21 of the hoop 15 surrounding the fixing zone of the pin 14. It can thus be easily realized that there has been provided according to the present invention an artificial tooth which comprises a body provided with a preferably conical hole or recess 9 whose walls converge and radially extend into said body. The recess 9 has an open end at the lingual face of the body and terminates within the body into an end or rear wall which may have an enlarged end portion 10. The tooth is further provided with a groove 12 substantially U-shaped in cross-section which extends from said open end of said recess 9 toward substantially the lateral faces of the tooth body, the groove 12 being defined by upper and lower walls and by end walls substantially coextensive with the said rear wall of the recess 9. Anchoring means are provided for said tooth body which comprises a hoop-shaped portion 15 for engagement with said groove 12, and a conically shaped pin 14 extending from said hoop-shaped portion 15 and for engagement within said recess 9, the axis of said pin 14 forming an angle with the axis of said hoop-shaped portion 15, said pin 14 fittingly engages said recess 9, whereas said hoop-shaped portion 15 fittingly engages the groove 12 and is fixed in position therein. As it is apparent from the drawing, the axis of recess 9 is inclined with respect to the axis of groove 12 and intersects the axis of groove 12 substantially at the open end of recess 9.

In order to form the bridge (Fig. 1) the hoops 15 corresponding to the three teeth 1, 2, and 3 in question are welded to each other and the supporting part thus formed terminates by two tongues 18 and 19 secured to fixing crowns 20 and 21 secured to the teeth 4 and 5, a portion of which remains in the mouth. Said crowns 20 and 21 may advantageously be covered by porcelain covering crowns shown in chain dotted lines in Fig. 1.

Figure 8:
Figure 9:
Fig. 9 is a perspective view.

Referring to the modification shown in Figs. 8 and 9, the body of the tooth is not provided with a hole 9. A groove 12 is provided on the lingual face and has an inclined upper surface 23 which is turned downwardly from said face.

On the other hand, the body includes a crown portion which is less high than the terminated tooth and which ends at its upper part by a slightly inclined plane surface 24 on which is adapted to bear the metal anchoring member 15 which terminates by the triturating face 11.

Said anchoring member comprises a hoop-shaped part which merges into the lingual face of the body which it embraces and has a projection 26 which penetrates into the groove 12 in which it is sealed.

It can be seen that a very rugged assembly is thus formed which fits the mouth perfectly.

While I have described what I at present consider preferred embodiments of my invention, it will be obvious that various changes may be made without departing from my invention, and I therefore aim in the appended claims to cover all such changes and modifications as fall within the true spirit and scope of my invention.

What I claim is:

1. An artificial tooth comprising a body provided with a conical recess having walls converging and radially extending into said body, said recess having an open end disposed at the lingual face of said body and an enlarged end within said body, and a groove extending from said open end in the outer face toward the sides of said body, said groove being defined by upper and lower walls of uniform depth and by end walls substantially coextensive with the enlarged end of said recess, the axis of said recess being inclined with respect to the axis of said groove and intersecting said axis of said groove substantially at said open end.

2. An artificial tooth comprising in combination a body provided with a conical recess having walls converging and radially extending into said body, said recess having an open end at the lingual face thereof and an enlarged end within said body, a groove substantially U-shaped in cross-section extending from said open end and embracing substantially the lateral faces of said body, said groove being defined by upper and lower walls and by end walls substantially coextensive with the enlarged end of said recess, and anchoring means for said body, said anchoring means comprising a hoop-shaped portion for engagement with said groove and a conically shaped pin extending from said portion and for engagement with said recess, the axis of said pin forming an angle with the axis of said hoop-shaped portion, said pin fittingly engaging said recess, said hoop-shaped portion fittingly engaging said groove and being fixed in position therein.

FRÉDÉRIC TRYFUS.